United States Patent [19]

Valdes et al.

[11] Patent Number: 4,501,310

[45] Date of Patent: Feb. 26, 1985

[54] OSCILLATING CUTTING APPARATUS

[76] Inventors: Guillermo A. Valdes, 4350 NW. 8 Ter., Room 300, Miami, Fla. 33126; Fernando F. Figueredo, 524 Ridgewood Rd., Key Biscayne, Fla. 33149; Benjamin G. Pacheco, 1090 W. 69 Pl., Hialeah, Fla. 33014; Armando Framil, 45 SW. 28 Rd., Miami, Fla. 33129

[21] Appl. No.: 427,836

[22] Filed: Sep. 29, 1982

[51] Int. Cl.³ .............................................. A01G 23/08
[52] U.S. Cl. .................................. 144/34 R; 30/381; 83/785; 83/830; 144/343; 144/336; 144/2 Z
[58] Field of Search .......... 83/785, 790, 830; 30/31, 66, 381, 382, 392; 144/343, 336, 34 R, 2 Z

[56] References Cited

U.S. PATENT DOCUMENTS

| | | | |
|---|---|---|---|
| 1,537,953 | 5/1925 | Lucich | 144/34 R |
| 2,037,121 | 4/1936 | Dean | 83/785 |
| 3,604,479 | 9/1971 | Jordan | 144/34 R |
| 4,258,763 | 3/1981 | Figueredo et al. | 144/34 R |
| 4,273,169 | 6/1981 | Baenen | 144/34 R |

Primary Examiner—W. D. Bray

[57] ABSTRACT

A cutting apparatus designed to produce an oscillating force which is transmitted to a cutting element, said cutting element having a plurality of cutting teeth disposed at intervals in a complete circle around the periphery of the cutting element. The direction of cutting of the cutting teeth of said cutting element is alternated in opposite directions so that when to the cutting element is applied an oscillatory force, half of the cutting teeth will cut in one direction and the other half in the opposite direction. Thus the cutting apparatus disclosed herein is designed to work with any oscillating flexible cutting element of the type described above.

3 Claims, 13 Drawing Figures

U.S. Patent Feb. 26, 1985 Sheet 1 of 3 4,501,310
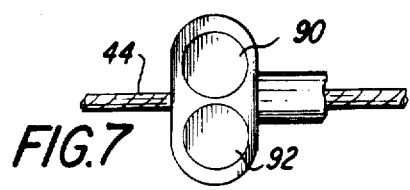
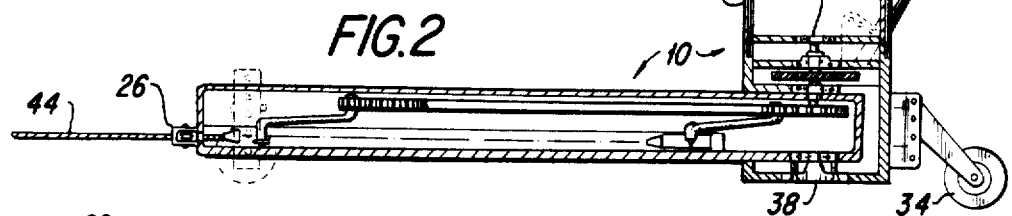
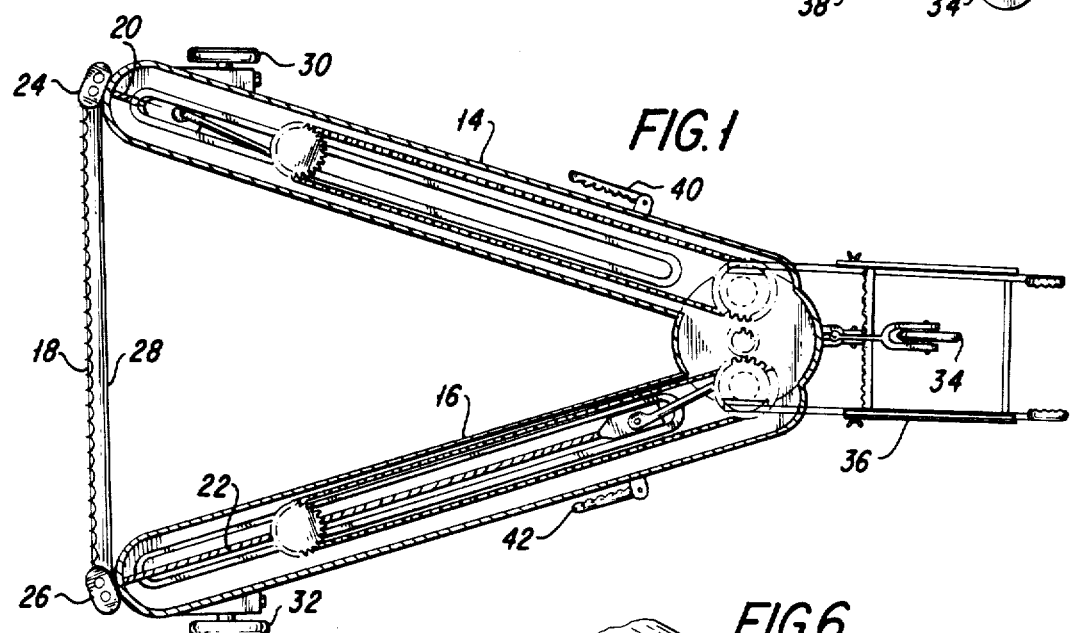
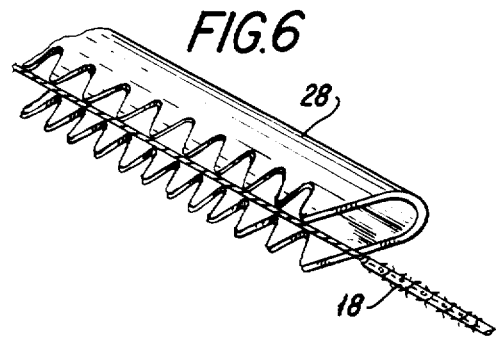
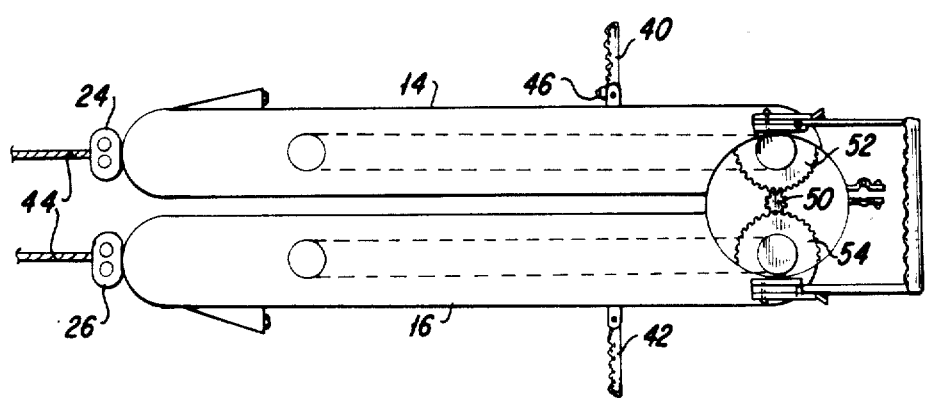

OSCILLATING CUTTING APPARATUS

BACKGROUND OF THE INVENTION

1. Field of the Invention

The present invention relates to motorized cutting devices having flexible cutting elements, and more particularly, to motorized cutting devices having their flexible cutting elements fabricated with cutting teeth disposed at predetermined intervals in a complete circle around the periphery of the cutting element.

2. Description of the Prior Art

U.S. Pat. Nos. 325,364 (Shipe), 2,855,724 (Graves), 3,090,159 (Wimeerly), 3,747,652 (Meadows), and 323,602 (Shipe) disclose manually operated cutting devices fabricated from a plurality of chain links which include a plurality of cutting teeth on a single side of the chain. The chain disclosed in the above-recited patents is deflectable in a single plane and is similar in fabrication to a bicycle chain.

U.S. Pat. No. 3,958,332 (Dates) discloses a power driven saw which causes a cable having a plurality of cutting elements to rotate in a single direction in order to provide a cutting action.

U.S. Pat. Nos. 1,175,302 (Sallee), 789,512 (Waller), and 1,520,422 (Lind) disclose chain saw cutting devices having a generally U-shaped fram for supporting the cutting chain and for rotating the cutting chain in a single direction to provide cutting action.

U.S. Pat. No. 2,749,949 (De La Tramerye) discloses two "thin steel strips", or metal bands, with cutting teeth punched out of one side of the strips, said strips being twisted to form a spiral twisted saw.

U.S. Pat. No. 2,752,964 (Prusinski) discloses a flexible hand saw with cutting units attached to a cable. The cutting units have a cylindrical shape with a continuous sharp cutting edge around the cylindrical unit. The continuous cutting edge does not allow for particles to escape after being cut and clogs up with only a few uses.

U.S. Pat. No. 4,258,763 (by the same inventors of the present invention) discloses a power driven apparatus with a specific mechanism designed to produce an oscillating force and using flexible cutting elements identical to the ones required by the invention being presented herein. The apparatus of U.S. Pat. No. 4,258,763, however, discloses a mechanism totally different to the one being disclosed by the present invention.

SUMMARY OF THE INVENTION

The present invention contemplates a power driven cutting apparatus comprising a flexible cutting element having cutting teeth disposed at intervals in a complete circle around the periphery thereof along a predetermined length. A frame is coupled to the cutting element for receiving and guiding the cutting element. Means coupled to the cutting element and to the frame imparts an oscillatory motion to the cutting element to enable the oscillating teeth of the cutting element to cut a selected material.

An important aspect of the present invention is the ability of the flexible cutting element to cut properly even though it is twisted as it oscillates back and forth with respect to a material.

Another important aspect of the present invention is its ability to cut a material without causing the flexible cutting element to pass through the drive system of the cutting element.

Another important aspect of this invention is safety. By using this invention, the operator can be located sufficiently far away from the object being cut to remove himself from any possible danger or hazardous situations. This measure of safety can only be appreciated when considering normally hazardous cutting operations such as cutting high tree branches or very large trees which with the use of this invention can be cut from the ground and at a large distance from the point of cutting.

Another important aspect of using this invention is that the size or width of the object being cut is not a limiting factor any more, as in existing cutting systems. By simply making the cutting element long enough or attaching sufficient standard size cutting elements together, any size object can be cut as long as the motorized unit is manufactured to provide sufficient force to do so.

Another important aspect of this invention is its ability to maintain an effective cutting operation in normally difficult or impossible situations using conventional cutting devices or equipment. Cutting trees or branches in swamps, lakes, on the side of steep hills or mountains, or cutting a tree in the midle of a dense forest, are examples of extremely difficult cutting operations using conventional equipment for tree-cutting. With the present invention, however, extension cables can be used to transmit the oscillating force to any point where the cutting process might be required, while the operator and the equipment can be positioned in an appropriately chosen safe location.

DESCRIPTION OF DRAWINGS

This invention is pointed out with particularity in the appended claims. However, other objects and advantages together with the operation of the invention may be better understood by reference to the following detailed description taken in connection with the following illustrations wherein:

FIG. 1 illustrates a top sectional view of the oscillating cutting apparatus with the top half of the main body frame removed. FIG. 1 illustrates the relative positions of various parts of the present invention to each other, and shows the side arms in an open V position for grass cutting and hedging operations.

FIG. 2 illustrates a side sectional view of the present invention.

FIG. 3 illustrates a top view of the present invention with side arms closed for remote tree cutting operations.

FIG. 6 provides an enlarged illustration of a section of the protective guard used with the cutting apparatus in conjunction with grass cutting hedging and bush trimming operations.

FIG. 7 provides an enlarged top and front view of a side arm pully used to guide extension cables of the oscillating cutting apparatus.

FIG. 9 illustrates a typical cutting element that can be used with the oscillating cutting apparatus with tubular cutting units containing cutting teeth disposed in a circle around the periphery of the cutting units with said cutting teeth oriented in opposite directions so that by imparting an oscillating force a cutting process is performed.

FIG. 10 also illustrates the same apparatus with arms opened to a predetermined V-shaped position without a protective guard coupled to said frame to perform the cutting operation straight into the tree.

DESCRIPTION OF THE PREFERRED EMBODIMENT

In order to better illustrate the advantages of the present invention and its contributions to the art, a preferred hardware embodiment of the invention will now be described in some detail.

Figure 4:
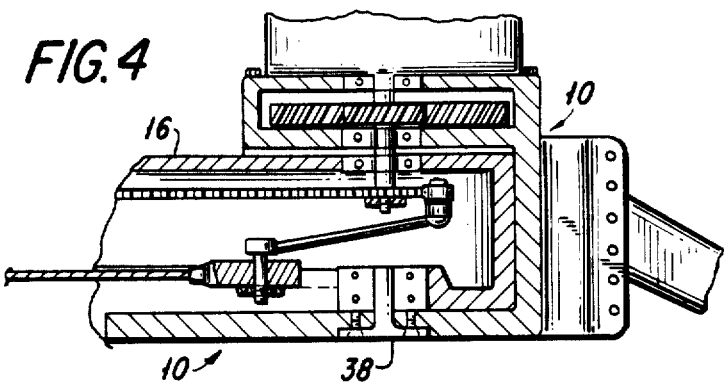
FIG. 4 is a sectional view of the back portion of the cutting apparatus illustrated in FIG. 2 taken along section line 4—4. This Figure illustrates the rotating arm assembly which allows the side arms to rotate to various predetermined positions depending on the operation desired.
Figure 5:
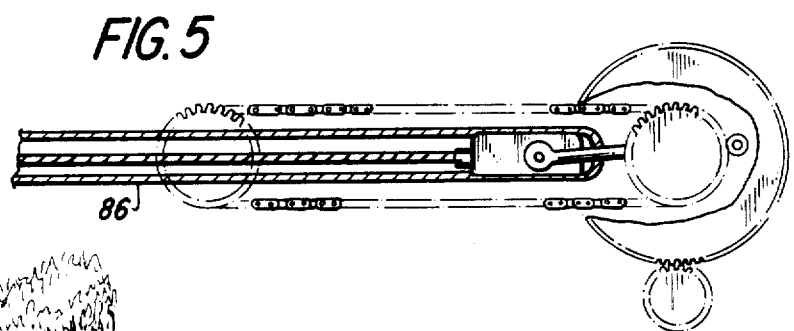
FIG. 5 illustrates a top view of the drive block sliding mechanism.
Figure 12:
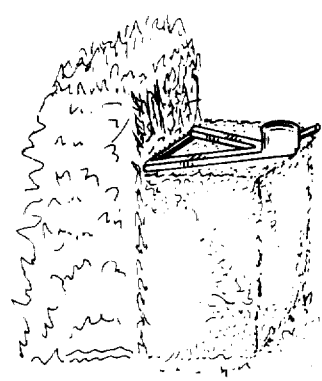
FIG. 12 illustrates a typical bush trimming/hedging operation with the arms of the cutting apparatus again opened to a predetermined V-shaped position and side handlebars opened for controlling and carrying the cutting apparatus. A protective guard is also used for these operations.

Referring to FIGS. 1, 2 and 3 a frame 10 includes a first arm 14 and a second arm 16 and a frame base 12 for housing the motorized rotating means and oscillating mechanism. A cutting element 18 is positioned between the ends of arms 14 and 16 and is attached to cables 20 and 22. Pulleys 24 and 26 are attached to the front of arms 14 and 16 to allow cables 20 and 22 to rotate freely and still maintain a predetermined alignment between the cutting element 18 and the cables 20 and 22. A protective guard 28, also illustrated in FIG. 6 is installed for grass cutting and hedging operations between arms 14 and 16 to provide a measure of safety from someone accidentally bumping the front of the apparatus while in operation. For grass cutting operations, wheels 30 and 32 are coupled to the frame on arms 14 and 16 respectively, a wheel 34 is coupled on the back end of the frame, and a push-handle structure 36 is attached to the top motor housing section 12. For tree trimming and cutting operations, all wheels, protective guard and the push-handle structure would be removed. The cutting apparatus would then have its arms 14 and 16 rotated to the inside to a closed position as illustrated in FIG. 3. Arms 14 and 16 would pivot on the frame through the use of pivot pins on each arm one of which is shown in FIGS. 2 and 4 denoted by reference number 38. Once the cutting apparatus is closed, side handles 40 and 42 are used to pick up the frame, made of lightweight material. Extension cables 44 are used to transmit the oscillating force produced by the cutting apparatus to the cutting element 18 at a location remote from the apparatus. Control button 46 will start and stop the oscillating mechanism.

Figure 8:
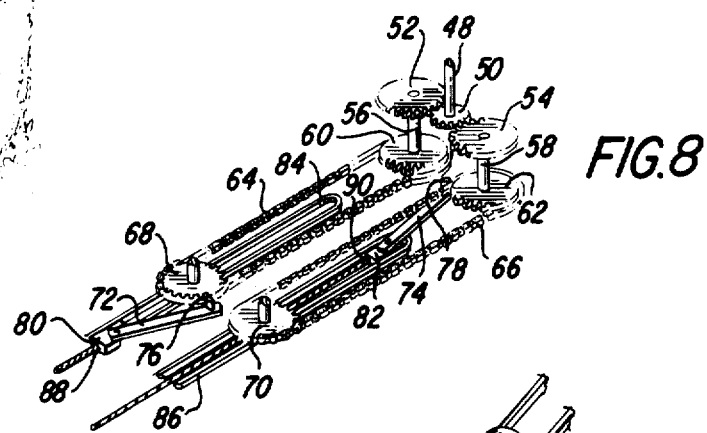
FIG. 8 provides an enlarged view of the various components of the oscillating mechanism used by the cutting apparatus.
Figure 11:
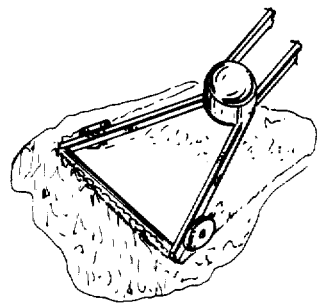
FIG. 11 illustrates a typical grass cutting operation with the arms of the cutting apparatus opened to a predetermined V-shaped position, and a protective guard coupled between the two arms of the apparatus.
Figure 13:
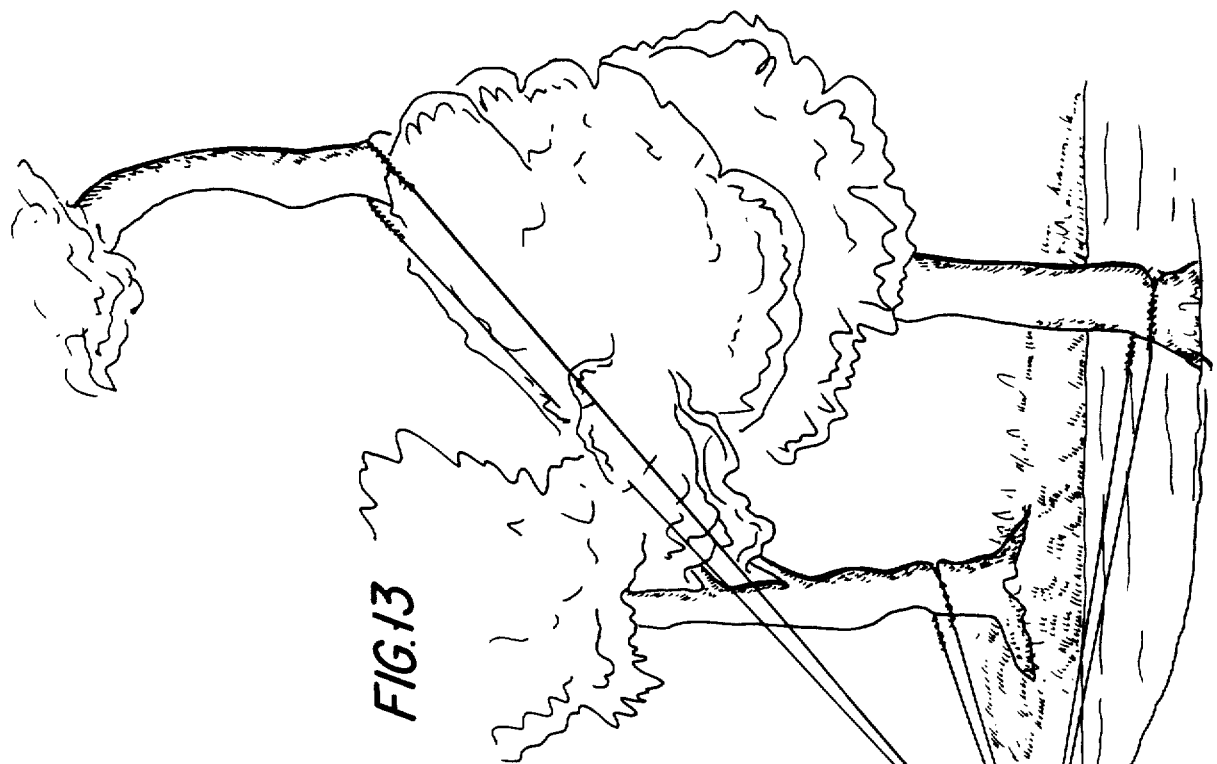
FIG. 13 illustrates a heavy duty version coupled to a tractor of the present invention wherein the same basic mechanism of the present invention is used with the additional feature that a multiple number of cutting operations can be performed using the same equipment. This illustration indicates the same heavy duty apparatus cutting a tree in a lake or a swamp, cutting a tree on the opposite bank of said lake or swamp, and cutting a tree on the top of a steep hill. These are very difficult cutting operations using conventional methods and become relatively simple using the present invention.
Figure 10:
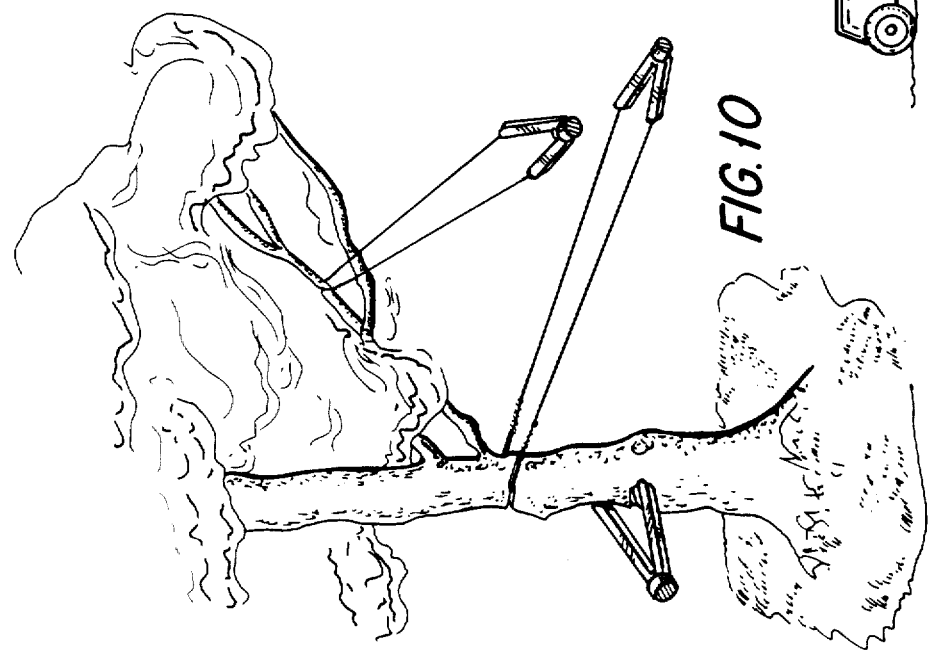
FIG. 10 illustrates 2 typical tree-cutting operations with the arms of the cutting apparatus closed for use with extension cables.

Referring now to FIGS. 1, 2 and 8, the oscillating mechanism will be described. A shaft 48 connected to rotating means is attached to sprocket 50. Rotation of shaft 48 therefore causes sprocket 50 to rotate in one direction. A side sprocket 52 and a second side sprocket 54 are positioned on opposite sides of sprocket 50 and in contact with sprocket 50. Side sprockets 52 and 54 are positioned in such a way that their sprocket teeth fall in between the sprocket teeth of sprocket 50 so that when sprocket 50 is caused to rotate it in turn causes sprockets 52 and 54 to rotate. Sprocket 52 is connected to a first drive sprocket 60 by a first drive shaft 56 and sprocket 54 is connected to a second drive sprocket 62 by a second drive shaft 58. Thus when sprockets 52 and 54 are caused to rotate, they will in turn cause drive sprockets 60 and 62 to rotate. A first chain 64, similar in fabrication to a bicycle chain and of a predetermined length, is placed around drive sprocket 60 and extended to and placed around free rotating sprocket 68; a second chain 66 similar to the first chain 64, is also placed around drive sprocket 62 and extended to and placed around a second free rotating sprocket 70. Thus, when drive sprockets 60 and 62 are caused to rotate, chains 64 and 66, and free rotating sprockets 68 and 70 are also caused to rotate. A first drive arm 72 is connected at the top end to chain 64 by a free rotating pin connection 76 which allows the point of connection between drive arm 72 and pin attachment 76 to freely rotate as chain 64 is caused to rotate. A second drive arm 74 is likewise connected to chain 66 by pin connection 70. The bottom ends of each drive arm 72 and 74 are connected to drive blocks 80 and 82 by similar rotating connections as those in 76 and 78. Each drive block 80 and 82 is located inside a sliding channel 84 and 86 with said drive blocks having male notches at either side fitting into female notches of sliding channels 84 and 86. Thus, with this assembly, when chains 64 and 66 are caused to rotate, then drive arms 72 and 74 with drive blocks 80 and 82 attached are caused to slide back and forth in the sliding channels 84 and 86. By synchronizing the locations of drive blocks 80 and 82 and the attachments of drive arms 72 and 74 on chains 64 and 66 so that when one block is at the front of its sliding channel the other one is at the back of its sliding channel and vice versa, then drive blocks 80 and 82 will oscillate back and forth in synchronized fashion when chains 64 and 66 are caused to rotate. To each drive block 80 and 82, extension cables are connected at each front end 88 and 90, so that the oscillating motion created by the drive blocks can be transmitted through the extension cables to a cutting element connected at some predetermined point to the extension cables. With this oscillating motion imparted on the cutting element, a cutting process can be effected by the cutting element.

Referring now to FIG. 4, the frame rotating arm assembly will be briefly described. This illustration shows that the main frame 10 of the apparatus holds the arm structure 16 by means of a rotating pin 38 which locks the arm structure in a specific location in relation to the drive sprocket assembly but still allows the arm structure to rotate around pin 38 as a pivot point.

Referring to FIG. 6 an enlargement of protective guard 28 is provided for use when cutting grass and hedging or trimming bushes. FIG. 6 illustrates that the structure of the protective guard assimilates a jagged tooth structure to allow the penetration of grass blades or bushes inside each tooth, so they can be cut off by cutting element 18. The protective guard structure, however, will not allow penetration by human limbs so that a safe cutting operation can be conducted.

Referring now to FIG. 7, the pulleys used to guide the extension cables and the cutting element will be described. This illustration indicates that two small free rotating pulleys 90 and 92 are used to have extension cables 44 pass in between the two pulleys. The two pulleys assembly has the purpose of insuring that the extension cables 44 will always leave the frame assembly in the same line of force.

As will be readily appreciated, one of the primary safety features of the present invention is the ability to position the cutting element at a safe distance from a human operator. This highly significant safety feature is not presently available in any motorized cutting system of a type similar to the present invention.

It will be apparent to those skilled in the art that the disclosed cutting device may be modified in numerous ways and may assume many embodiments other than the preferred forms specifically set out and described above. Accordingly, it is intended by the appended claims to cover all such modifications of the invention which fall within the true spirit and scope of the invention.

We claim:

1. A cutting apparatus comprising:
   (a) a flexible cutting element having first and second ends and cutting teeth disposed at intervals in a complete circle around the outer periphery of the cutting element, said cutting teeth being disposed alternately in opposite directions to enable said cutting element to cut a selected material when an oscillating motion is imparted,
   (b) a frame coupled to said cutting element for receiving and guiding said cutting element,
   (c) means coupled to said cutting element and to said frame for imparting an oscillatory motion to said element thereby performing a cutting operation, said oscillating means including:
      i. a shaft having first and second ends, said first end being coupled to rotating means to cause the shaft to rotate,
      ii. said second end of said shaft having a rotating sprocket attached,
      iii. said rotating sprocket having a first side-sprocket coupled on one side and a second side-sprocket coupled on the opposite parallel side,
      iv. said first side-sprocket being connected to the first end of a first shaft and the second side-sprocket being connected to the first end of a second shaft,
      v. said first shaft having a first drive-sprocket connected on the second end and said second shaft having a second drive-sprocket connected on the second end,
      vi. a first chain, similar in structure to a bicycle chain, placed around said first drive-sprocket, and extended to and placed around a first free-rotating-sprocket,
      vii. a second chain, similar to the first chain, placed around said second drive-sprocket and extended to and placed around a first free-rotating sprocket,
      viii. a first drive-arm connected on its first end to said first chain by a free rotating pin connection and connected to a first drive block at its second end,
      ix. a second drive arm connected on its first end to said second chain by a free rotating pin connection and connected to a second drive block at its second end,
      x. guide means connected to said first and second drive blocks and to the cutting element so that when the two chains are caused to rotate, the two chains in turn cause the two drive arms to push the two drive blocks back and forth along a straight line thus converting the chains' rotating motions to oscillating motions.

2. The cutting apparatus of claim 1 wherein said guide means includes:
   (a) a first sliding channel with a female notch along the length of the sliding channel so that said first drive block containing a male notch can slide freely with no side movements or vibrations as it slides back and forth along said first sliding channel, and
   (b) a second sliding channel with a female notch along the length of the sliding channel so that said second drive block containing a male notch can slide freely with no side movements or vibrations as it slides back and forth along said second sliding channel, and
   (c) extension cables connecting said first and second drive blocks to said cutting element.

3. The cutting apparatus of claim 2 wherein said extension cables are connected to said cutting element by having:
   (a) a first extension cable with a first and a second end wherein;
      i. the first end of said first extension cable is connected to said first drive block,
      ii. the second end of said first extension cable is passed through a first guiding pulley attached to the frame of the cutting apparatus at the second end of the first arm, and
      iii. attaching the second end of said first extension cable to one end of said cutting element.
   (b) a second extension cable with a first and a second end wherein:
      i. the first end of said second extension cable is connected to said second drive block,
      ii. the second end of said second extension cable is passed through a second guiding pulley attached to the frame of the cutting apparatus at the second end of the second arm, and
      iii. attaching the second end of said second extension cable to the other end of said cutting element.

* * * * *